Patented July 5, 1949

2,475,155

UNITED STATES PATENT OFFICE 2,475,155

PROCESS OF PRODUCING A SUPPORTED PLATINUM METAL CATALYST

Edgar F. Rosenblatt, East Orange, N. J., assignor to Baker & Company, Inc., Newark, N. J., a corporation of New Jersey No Drawing. Application December 27, 1945, Serial No. 637,483

8 Claims. (Cl. 252—460)

This invention relates generally to catalysts and is concerned in particular with the production of supported catalysts.

The employment of supported catalysts, comprising a catalyst metal such as platinum deposited on a carrier, is well known in various catalytic processes such, for example, as hydrogenation processes. The activity and performance of such supported catalysts depend on a number of factors, for instance the nature of the catalyst metal and its inherent catalytic properties, the type of support employed, the method by which the catalyst metal is deposited upon the support, etc., and other factors, many of which are not clearly understood in their import or the reasons therefor.

Supported platinum metal catalysts are usually produced by providing a solution containing a compound of the platinum metal, bringing the solution in contact with the support, e. g. by soaking, and reducing the platinum metal compound by the employment of reducing agents or heat, whereupon the platinum metal is deposited, usually in metallic form, upon the support during the reduction of the compound.

Such methods of producing supported platinum metal catalysts as heretofore practiced are, however, in many cases deficient in that the resultant catalyst does not have maximum catalytic efficiency which in the production of supported catalysts is the prime object. Also such methods are frequently cumbersome and difficult to practice.

It is therefore one object of this invention to provide a method of producing supported platinum metal catalysts which shall be simple and effective. It is another object of this invention to provide by means of such method a supported platinum metal catalyst which shall have a high catalytic efficiency. Other objects and advantages of this invention will appear from the description thereof hereinafter following.

This application is a continuation-in-part of my earlier co-pending application, Serial No. 426,281, filed January 10, 1942, now abandoned.

The method of my invention involves, broadly, the contacting of certain platinum metal compounds, more fully specified hereinafter, in aqueous solution with certain types of supporting carriers in such manner that the platinum metal compound hydrolyzes and forms a firm and adherent deposit of platinum metal oxide or hydroxide on the surface of such carrier, the oxide so formed being subsequently reduced to catalytically active platinum metal. This method involves the utilization of compounds of platinum or palladium in which such platinum metal, i. e. platinum or palladium, has a valency of 2 and the employment of carrier materials in the form of certain dehydrated oxides.

The carrier thus employed in the production of the catalyst herein involved comprises a solid dehydrated, e. g. anhydrous, oxide of an element taken from groups III to VIII of the periodic system, such as chromium oxide, zirconium dioxide, iron oxide, silica, dehydrated silica gel, or the like. In fact, the best carriers for the practice of my invention are constituted by dehydrated earth metal oxides such for instance as in particular aluminum oxide. The carrier specified must, of course, be insoluble in water and should not comprise a precious metal oxide.

The compound of platinum or palladium in aqueous solution, employed in the method of the invention, is a compound in which the platinum or palladium has a valency of 2. Insofar as platinum compounds are concerned I use, therefore, for instance the salts of the tetrachloroplatinic acid, e. g. the potassium salt, $K_2PtCl_4$, containing two valent platinum, i. e. chlorocomplexes of the general formula —$Me_2PtCl_4$, rather than the salts of the four valent platinic acid of the general formula —$Me_2PtCl_6$. Likewise, in the case of palladium, I use salts of the two valent palladium, e. g. the sodium salt, $Na_2PdCl_4$, of tetrachloropalladic acid. Other hydrolyzable salts of platinum or palladium will readily suggest themselves to the experts in the art.

The hydrolysis of the platinum or palladium compound precipitates an oxide or hydroxide of platinum or palladium, respectively, on the specified carrier in a firmly adherent coating. The oxide or hydroxide of platinum or palladium is then reduced by suitable reducing agents, and the final catalyst obtained.

The following examples will illustrate the method according to my invention:

*Example 1*

1 g. aluminum oxide powder in its ignited form is suspended in water and 5 ml. of a solution of sodium palladium chloride containing 50 mg. palladium are added. The aqueous mixture is boiled under stirring. A firmly adhering coating of palladium oxide is formed on the alumina carrier. The palladium oxide is then reduced and the resultant product is dried and represents the finished catalyst. The pH value of the solution was 5.5. The reduction of the palladium oxide may also be carried out simultaneously with the use of the catalyst in a hydrogenation process.

Example 2

1 g. chromium oxide, as obtained for instance by the ignition of ammonium bichromate, is suspended in water and 5 ml. of sodium palladium chloride solution containing 50 mg. palladium are added. 1 g. sodium bicarbonate dissolved in water is added to the solution. The aqueous mixture is boiled until the solution is colorless. The palladium oxide is reduced and the catalyst filtered and dried. The pH value of the solution was 8.

Example 3

10 g. activated alumina tablets are boiled with a wetting agent, filtered and washed. 5 ml. of an aqueous solution containing 50 mg. palladium in the form of sodium palladium chloride are added to the half-dry pellets and the aqueous mixture is boiled. After precipitation, the palladium oxide is reduced and the catalyst obtained. The pH value of the solution was 5.5.

Example 4

5 g. of hard dehydrated silica gel are boiled in a solution containing sodium bicarbonate, with or without a wetting agent, until substantially all air has escaped from the fine pores of the gel. The silica gel is filtered off and slightly washed with water. 5 ml. of a sodium palladium chloride solution containing 50 mg. palladium are added, without further addition of water, and the aqueous mixture is boiled. After precipitating the palladium oxide and reduction thereof to metallic palladium, the catalyst is filtered and dried. In this case the sodium bicarbonate not only facilitates the hydrolysis of the palladium compound but also fills the pores of the silica gel so that the palladium oxide precipitate is concentrated on the outer surface of the gel where maximum concentration of the metal is desirable for catalytic reactions. The sodium bicarbonate is removed by washing the catalyst either prior or subsequent to the reduction of the palladium oxide. The pH value of the solution was 8.

Example 5

10 g. of activated alumina tablets are boiled with the aqueous solution of a wetting agent, filtered and washed. 100 mg. $K_2PtCl_4$ dissolved in 10 ml. water, are added to the half-dry tablets and the solution is boiled. After precipitation the black platinous oxide is reduced and the catalyst is ready for use. The pH value of the solution was between 6 and 7.

The hydrolysis of the platinum or palladium compound usually requires heating of the solution. In the case of aluminum oxide carriers the hydrolytic effect is produced by simply heating a suitable aqueous solution of the hydrolyzable platinum or palladium compound, but in other cases, for instance where the carrier comprises dehydrated silica gel, the hydrolysis proceeds best when a suitable alkalizing agent, such as sodium bicarbonate, is added to the solution.

The reaction taking place is primarily a hydrolysis. It was found, for instance, that sodium palladium chloride, $Na_2PdCl_4$, dissolved in water, is of acid reaction nature which would not be expected of a complex salt of such formula, the acid reaction being due to the incipient hydrolysis which may be formulated as $$Na_2PdCl_4 + 2HOH \rightarrow 2NaCl + 2HCl + Pd(OH)_2$$

The equilibrium of this reaction is very much in favor of the complex palladium salt on the left side of the formula, but it may shift, completely or almost completely, to the right side if one of the components on the right side is removed. It was surprising to find that aluminum oxide for instance serves this purpose. The highly insoluble character of dehydrated ignited aluminum oxide is generally known; in analysis, for instance, it withstands all acids, even aqua regia, and has to be melted with soda to form a water soluble compound. It can hardly be assumed, therefore, that the minute amount of acid formed by the incipient primary hydrolysis reacts with $Al_2O_3$ according to any such equation as $Al_2O_3 + 6HCl \rightarrow 2AlCl_3 + 3H_2O$, and that by such reaction the hydrolysis is made to progress. In this respect it may also be noted that I could find no aluminum chloride in the filtrate. It is more probable that the aluminum oxide is capable of absorbing the primarily hydrolyzed palladium on its surface, and that thus the palladium hydroxide is continuously removed from the equilibrium and thereby the reaction caused to proceed from the left to the right, till complete hydrolysis has taken place. It is a fact, regardless of the theoretical explanation, that while a sodium palladium chloride solution as such stays a clear solution when boiled, the same sodium palladium chloride solution is hydrolyzed under almost complete precipitation of the palladium when boiled in the presence of the highly insoluble and chemically inactive dehydrated aluminum oxide. Not in all cases does this hydrolytic process proceed just by the addition of a dehydrated solid oxide taken from groups III to VIII of the periodic system. The astonishing fact that in boiling such a solution the hydrolyzed palladium oxide is completely or almost completely attached to the surface of the carrier, suggests that also in those cases adsorption plays an important part in the reaction.

The coating of catalyst metal of the group consisting of platinum and palladium on the carrier, as obtained by the hydrolytic process, is extremely firm and adherent. The method according to my invention is very suitable for the production of highly active powder catalysts, but it is especially valuable for the manufacture of supported catalysts having granular or preformed carriers such as pellets, tablets, pills, etc. The method also allows the production of catalysts having chemically inert carriers which heretofore were mainly platinized by soaking processes. Catalysts prepared by soaking, and deposition during subsequent reduction, contain the catalyst metal distributed through the whole carrier, particularly in the case of compressed preformed carriers, whereby the catalyst metal distributed within such carriers is inaccessible to the catalytic reactants, whereas catalysts produced in accordance with my invention have the catalyst metal accumulated on the surface only, even in the case of compressed preformed carriers, whereby all such platinum or palladium is available for the catalytic reaction. One reason for the deposition of the platinum and palladium on the surface only of the carrier is the great speed with which the hydrolysis takes place in the method of the invention so that the catalyst metal compound has no opportunity to penetrate into any pores of the body of the carrier.

In order to make possible such hydrolysis at the surface of the carrier only, and thus prevent the deposition of the catalyst metal within the pores or cavities of the carrier, the carrier must have basic, rather than acid, characteristics. The dehydrated oxide specified must, therefore, be of basic characteristics either inherently, as in the case of earth metal oxide and zirconium dioxide, or it must be made basic, as e. g. in case of silica gel which must be treated with an alkalizing agent, such as bicarbonate of soda, prior to contacting it with the catalyst metal solution.

The specified method is simple and economical, and is thereby also highly superior to the production of supported catalysts by a fusion method entailing high temperature and the use of aggressive salt melts, which would destroy many carriers, which as for instance activated alumina can easily be platinized or palladized according to my invention.

The reduction of the platinum or palladium oxide to catalytically active metal takes place in any suitable manner either before use as catalyst or simultaneously with its use as hydrogenation catalyst except that such reduction should not be accomplished by heat. Preferably such reduction takes place immediately after completion of the hydrolysis and while the catalyst is still immersed within the hydrolysis solution, being accompanied therein by the addition of suitable reducing agents e. g. hydrazine salts, sodium formate, etc.

The prime feature of my invention is that it permits the production of highly active supported catalysts involving dehydrated oxide carriers as described. A dehydrated silica gel catalyst, containing 50 mg. palladium, prepared by the method according to my invention liberated 1600 ml. hydrogen in 50 min. in the liquid stage dehydrogenation of tetrahydronaphthalene, as compared with 210 ml. hydrogen developed from a like solution in like time by a catalyst of dehydrated silica gel, also containing 50 mg. palladium, but prepared by soaking the silica gel carrier in a sodium palladium chloride solution and following reduction to palladium. In the hydrogenation of nitrobenzene 1 g. of a palladium catalyst in accordance with my invention consisting of a ferric oxide carrier containing 5% palladium by weight causes the absorption of 560 ml. hydrogen in 5 min., and 1 g. of a palladium catalyst produced in accordance with my invention consisting of a zirconium dioxide carrier and containing 5% palladium by weight causes the absorption of 690 ml. hydrogen in 5 min. In another experiment involving the dehydrogenation of tetrahydronaphthalene a palladium catalyst produced in accordance with my invention by hydrolyzing 100 mg. potassium platinous chloride in a 10 ml. aqueous solution in the presence of 10 g. aluminum oxide tablets liberated 600 ml. hydrogen from the boiling tetrahydronaphthalene in 50 min.

The catalytic activity of catalysts prepared in accordance with my invention and embodying the specified chemically inactive dehydrated oxide carriers is highly superior to that of catalysts prepared by reacting platinum metal solutions with chemically active carriers such as freshly precipitated hydroxides. I have found, for instance, that a palladium catalyst comprising 1 g. of a carrier of ignited aluminum oxide and 5% by weight of palladium, prepared in accordance with my invention, caused the absorption of 570 ml. hydrogen in 5 min. in the reduction of nitrobenzene, whereas a palladium catalyst comprising 1 g. of a carrier of aluminum hydroxide and 5% by weight of palladium, produced by reacting a palladium salt in aqueous solution with chemically active aluminum hydroxide, caused the absorption of only 150 ml. hydrogen in 5 min. in the reduction of nitrobenzene.

The pH value of the platinum or palladium compound solution employed in the hydrolysis method of producing supported catalysts in accordance with the invention has an important bearing on the degree of catalytic efficiency of the resultant catalyst. In the case of palladium catalysts I have found that the solution should preferably have a pH value within the range of about 5 to about 12. Thus, for instance, in the hydrogenation of a 100 cc. methanol solution containing 4 cc. nitrobenzene, the hydrogen absorption in the presence of a 5% palladium activated alumina catalyst produced by hydrolysis of sodium palladium chloride amounted to 570 cc. in the case of a catalyst produced from a solution having a pH value of 4.6 and to 860 cc. and 820 cc., respectively, in cases of like catalysts produced from like aqueous solutions having a pH value of 8 and 11, respectively. Thus in such case it is desirable to neutralize any acid set free in the hydrolysis, as for instance by adding sodium bicarbonate. On the other hand, in the case of platinum catalysts, I have found that the solution should preferably have a pH value within the range of about 1 to about 8. Thus for instance in the hydrogenation of 100 cc. methanol solution containing 4 cc. nitrobenzene, the hydrogen absorption in the presence of a 1% platinum activated alumina catalyst produced by hydrolysis of potassium platinous chloride amounted to 260 cc. where the catalyst employed had been produced from an aqueous solution having a pH value of 10, but to 440 cc., 810 cc. and 860 cc. where the catalyst had been produced in like manner from a like solution having a pH value of 8, 4.6 and 3.5, respectively. It would appear, therefore, that the efficiency of the catalyst tends to increase with increasing pH value of the solution in the case of palladium catalysts and with decreasing pH value of the solution in the case of platinum catalysts. In the experiment just mentioned involving the utilization of 5% palladium and 1% platinum activated alumina catalysts, there were used in such experiment 25 mg. palladium and platinum, respectively, as catalyst metal. It is important for the efficiency of the catalyst that such pH value is maintained during the reduction of the platinum oxide or palladium oxide formed during the hydrolysis.

The catalysts produced by the practice of the method of my invention can be used in various catalytic processes, e. g. oxidation, polymerization, synthesis, hydrogenation or dehydrogenation processes, etc., although they are specially useful for the reduction of oxygen or oxygen containing compounds.

The method of producing supported catalysts according to my invention provides, therefore, catalysts of extremely high catalytic efficiency. Catalysts produced by such method do not suffer from impairment of catalytic activity experienced with supported catalysts wherein the catalyst metal deposit is produced on the carrier by reduction of platinum or palladium compounds directly from a solution or by soaking the carrier with the platinum or palladium compound solution and reducing the compound by heat. The method according to my invention is of particular benefit for supported catalysts embodying the specified dehydrated oxide carriers where it is calculated to produce particularly advantageous results. The term "oxide" as herein used in connection with platinum and palladium includes not only oxides as such, but also hydroxides. The term "non-precious" as herein used means elements not belonging to the group of precious metals consisting of platinum metals, gold and silver.

What I claim is:

1. The method of producing a supported catalyst, comprising hydrolyzing a compound of catalyst metal taken from the group consisting of platinum and palladium, said compound containing said catalyst metal in the two valent state, in an aqueous solution in the presence of a carrier of solid water insoluble dehydrated basic oxide of a non-precious element taken from groups III to VIII of the periodic system, and thereby precipitating an oxide of said catalyst metal on the surface of said dehydrated oxide carrier by hydrolysis of said compound of catalyst metal at such surface only, and reducing said catalyst metal oxide to catalytically active catalyst metal.

2. The method of producing a supported catalyst, comprising hydrolyzing a compound of catalyst metal taken from the group consisting of platinum and palladium, said compound containing said catalyst metal in the two valent state, in an aqueous solution in the presence of a carrier of dehydrated aluminum oxide, and thereby precipitating an oxide of said catalyst metal on the surface of said dehydrated oxide carrier by hydrolysis of said compound of catalyst metal at such surface only without substantial penetration into the body of said carrier, and reducing said catalyst metal oxide to catalytically active catalyst metal.

3. The method of producing a supported catalyst comprising hydrolyzing a compound of palladium in the two valent state in an aqueous solution in the presence of a carrier of activated alumina, thereby precipitating an oxide of palladium on the surface of said activated alumina carrier by hydrolysis of said compound of palladium at such surface only, and reducing said palladium oxide to catalytically active palladium.

4. The method of producing a supported catalyst comprising hydrolyzing a compound of palladium in the two valent state in an aqueous solution in the presence of a carrier of solid water insoluble dehydrated basic oxide of a non-precious element taken from groups III to VIII of the periodic system, thereby precipitating an oxide of palladium on the surface of said dehydrated oxide carrier by hydrolysis of said compound of palladium at such surface only, and reducing said palladium oxide to catalytically active palladium within said solution, said solution at least during said reduction having a pH value of from about 5 to about 12.

5. The method of producing a supported catalyst comprising hydrolyzing a compound of platinum in the two valent state in an aqueous solution in the presence of a carrier of solid water insoluble dehydrated basic oxide of a non-precious element taken from groups III to VIII of the periodic system, thereby precipitating an oxide of platinum on the surface of said dehydrated oxide carrier by hydrolysis of said compound of platinum at such surface only, and reducing said platinum oxide to catalytically active platinum within said solution, said solution at least during said reduction having a pH value of from about 1 to about 8.

6. The method of producing a supported catalyst, comprising hydrolyzing a compound of catalyst metal taken from the group consisting of platinum and palladium, said compound containing said catalyst metal in the two valent state, in an aqueous solution in the presence of a carrier of solid water insoluble dehydrated inherently basic oxide of a non-precious element taken from groups III to VIII of the periodic system, and thereby precipitating an oxide of said catalyst metal on the surface of said dehydrated oxide carrier by hydrolysis of said compound of catalyst metal at such surface only, and reducing said catalyst metal oxide to catalytically active catalyst metal.

7. The method of producing a supported catalyst, comprising hydrolyzing a compound of catalyst metal taken from the group consisting of platinum and palladium, said compound containing said catalyst metal in the two valent state, in an aqueous solution in the presence of a carrier of insoluble dehydrated inherently basic oxide taken from the group consisting of earth metal oxide and zirconium dioxde, thereby precipitating an oxide of said catalyst metal on the surface of said dehydrated oxide carrier by hydrolysis of said compound of catalyst metal at such surface only, reducing said catalyst metal oxide to catalytically active catalyst metal.

8. The method of producing a supported catalyst, comprising hydrolyzing a compound of palladium, said compound containing palladium in the two valent state, in an aqueous solution in the presence of a carrier of insoluble dehydrated inherently basic oxide taken from the group consisting of earth metal oxide and zirconium dioxide, thereby precipitating palladium oxide on the surface of said dehydrated oxide carrier by hydrolysis of said compound of palladium at such surface only, reducing said palladium oxide to catalytically active palladium metal.

EDGAR F. ROSENBLATT.

REFERENCES CITED

The following references are of record in the file of this patent:

UNITED STATES PATENTS

| Number | Name | Date |
| --- | --- | --- |
| 1,111,502 | Schwarcman | Sept. 22, 1914 |
| 1,215,396 | Mittasch et al. | Feb. 13, 1917 |
| 1,222,260 | Paal | Apr. 17, 1917 |
| 1,739,306 | Holmes | Dec. 10, 1929 |
| 1,828,380 | Rotger et al. | Oct. 20, 1931 |
| 2,200,522 | Streicher | May 14, 1940 |
| 2,330,664 | Bennett et al. | Sept. 28, 1943 |
| 2,333,216 | Treischmann | Nov. 2, 1943 |

FOREIGN PATENTS

| Number | Country | Date |
| --- | --- | --- |
| 436,906 | Great Britain | Oct. 21, 1935 |
| 477,026 | Great Britain | Dec. 16, 1937 |